(12) United States Patent  (10) Patent No.: US 9,234,538 B2
Crutchley                  (45) Date of Patent:     Jan. 12, 2016

(54) FASTENER

(75) Inventor: Derek Crutchley, Warrington (GB)

(73) Assignee: Avdel UK Limited (GB)

( * ) Notice: Subject to any disclaimer, the term of this patent is extended or adjusted under 35 U.S.C. 154(b) by 177 days.

(21) Appl. No.: 13/640,670

(22) PCT Filed: Mar. 10, 2011

(86) PCT No.: PCT/GB2011/050474
§ 371 (c)(1),
(2), (4) Date: Oct. 11, 2012

(87) PCT Pub. No.: WO2011/131956
PCT Pub. Date: Oct. 27, 2011

(65) Prior Publication Data
US 2013/0025111 A1    Jan. 31, 2013

(30) Foreign Application Priority Data
Apr. 23, 2010 (GB) .................................. 1006827.8

(51) Int. Cl.
B23P 11/00   (2006.01)
F16B 21/00   (2006.01)
F16B 19/10   (2006.01)
F16B 5/06    (2006.01)

(52) U.S. Cl.
CPC ........... *F16B 19/1081* (2013.01); *F16B 5/0642* (2013.01); *F16B 19/1027* (2013.01); *Y10T 29/49948* (2015.01)

(58) Field of Classification Search
CPC .... F16B 5/0004; F16B 5/0084; F16B 5/0088; F16B 5/0092; F16B 5/02; F16B 5/0208; F16B 5/0258; F16B 5/04; F16B 5/0642; F16B 19/1027; F16B 19/1063; F16B 19/1081; F16B 19/05; F16B 13/045; F16B 39/24; Y10T 29/49948; Y10T 29/49957
USPC ............... 411/39, 43, 70, 103, 107, 113, 339, 411/353, 372, 476, 510, 533, 998; 403/408.1; 29/525.02, 525.04
See application file for complete search history.

(56) References Cited

U.S. PATENT DOCUMENTS

| 3,377,907 | A | * | 4/1968  | Hurd ................................. 411/70 |
| 3,483,787 | A | * | 12/1969 | Saunders ........................ 411/510 |
| 3,726,553 | A | * | 4/1973  | Reynolds et al. ............ 403/408.1 |
| 4,138,921 | A | * | 2/1979  | McGauran et al. ............. 411/510 |
| 4,233,878 | A | * | 11/1980 | McGauran et al. ............. 411/510 |
| 4,432,679 | A | * | 2/1984  | Angelosanto et al. ........... 411/34 |
| 4,609,317 | A | * | 9/1986  | Dixon et al. .................... 411/339 |
| 4,615,655 | A | * | 10/1986 | Dixon ............................. 411/339 |
| 4,846,611 | A | * | 7/1989  | Sadri et al. ....................... 411/43 |
| 4,984,947 | A | * | 1/1991  | Flauraud ......................... 411/43 |

(Continued)

FOREIGN PATENT DOCUMENTS

CN   2677685    9/2005
EP   0381409    8/1990

(Continued)

*Primary Examiner* — Essama Omgba
(74) *Attorney, Agent, or Firm* — Hahn, Loeser & Parks, LLP; Arland T. Stein

(57) ABSTRACT

A fastener for installation in a workpiece, the fastener comprising a pin and a body comprising a shell and a radially enlarged head, wherein a first engaging means comprising a nylon sleeve is located within a bore of the shell, and a second engaging means comprising a plurality of barbs is located on the exterior of at least part of the pin shank, and wherein the pin shank is insertable into the bore of the body from an end of the body remote from the head end, such that the first and second engaging means mutually engage.

5 Claims, 9 Drawing Sheets

(56) References Cited

U.S. PATENT DOCUMENTS

| | | | | |
|---|---|---|---|---|
| 6,077,012 A * | 6/2000 | Granese | ............... | F16B 19/05 411/361 |
| 6,551,040 B1 * | 4/2003 | Terry et al. | ............... | 411/43 |
| 2015/0167709 A1 * | 6/2015 | Buchta | ............... | F16B 43/00 411/546 |

FOREIGN PATENT DOCUMENTS

| | | | |
|---|---|---|---|
| GB | 1334236 | 10/1973 | |
| GB | 1538423 | 1/1979 | |
| GB | 1600490 | 10/1981 | |
| GB | 1600860 | 10/1981 | |
| GB | 2326908 | 1/1999 | |
| JP | SHO 44-9531 | 4/1969 | |
| JP | HEI 4-500115 | 1/1992 | |
| JP | 3026743 | 5/1995 | |
| JP | 2001-12425 | 1/2001 | |
| TW | 275097 | 1/1996 | |
| WO | WO 8604965 A1 * | 8/1986 | .............. F16B 19/10 |

* cited by examiner

FASTENER

CROSS-REFERENCE TO RELATED APPLICATIONS

The application is a national phase filing of International Application No. PCT/GB2011/050474, filed on Mar. 10, 2011, while claims priority to Great Britain Application No. 1006827.8, filed on Apr. 23, 2010, each of which is incorporated herein by reference.

BACKGROUND AND SUMMARY

The present invention relates to a fastener for insertion through aligned apertures in workpiece members thereby to secure the members together, and particularly for fasteners suitable for low grip applications, i.e. applications wherein the total width of the workpiece members being secured together is relatively small.

A currently known fastener for insertion through aligned apertures in workpiece members is commercially available under the Registered Trade Mark AVTAINER, as illustrated in FIGS. 1a to 3. The known fastener 2 comprises a pin 6 (as shown in FIG. 1a), and a body 4 (as shown in FIG. 1b). The pin comprises a shaft 42, a head 44, and a breakneck point 46. The body comprises a shell 8 and a nylon sleeve 10. The shell 8 comprises a radially enlarged head 12 at one end and an elongated shank 14 protruding therefrom, and a bore 16 extending axially completely through the body 4. The sleeve 10, which is located inside the elongated shank 14 of the shell 8, forms a first engaging means, and a barbed portion 52 comprising a plurality of annular barbs 18 on the pin 6 form a second engaging means.

FIGS. 2a and 2b illustrate the installation sequence of fastener 2 into a workpiece comprising workpiece members 20, 22. Firstly, as shown in FIG. 2a, the pin 6 is driven into the aligned apertures 54, 56 provided in the workpiece members 20, 22, by applying a force to the pin head 44. A plain portion 78 of the pin shank 42 is a press fit within the workpiece apertures 54, 56. FIG. 2a shows the pin 6 after it has been driven into the aligned apertures 54, 56.

Subsequently the body 4 is pushed, shank 14 first, onto the protruding end of the pin shank 42, until the leading end of the sleeve 10 abuts the barbed portion 52 of the pin 6. FIG. 2b shows the fastener after this stage has been completed.

The installation of the fastener 2 is completed by using a tool (not shown) to simultaneously pull the pin 42 shank and force the body 4 further along the pin shank 42 until the barbs 18 of the pin 6 mutually engage with the sleeve 10 of the body 4, and the underside surface 58 of the shell head 12 abuts the outer face 72 of workpiece member 22 remote from the pin head 44. The pin shank 142 is pulled until the it fails in tension at the breakneck point 46.

FIG. 3 shows the fastener 2 fully installed into the workpiece to secure workpiece members 20, 22 together, wherein the barbs 18 of the pin 6 are embedded into sleeve 10 of the body 4. The grip, i.e. the total thickness of the workpiece members 20, 22, is indicated by S. To provide the necessary tensile strength of the installed fastener 2, all barbs 18 must be engaged with the sleeve 10, and therefore the grip S must be greater than the length L of the shank 14, because the sleeve 10 is enclosed within this length, and this length must be less than the grip S to ensure that the joint is secured. Although the minimum grip could be reduced by reducing the length of the fastener 2, this would also result in an unacceptable reduction in tensile strength of the installed fastener. A reduction in the length over which the barbs 18 mutually engage with the sleeve 10 would result in an unacceptable reduction in the tensile strength of the installed fastener 2.

Accordingly, the minimum grip of the prior art fastener is restricted by the length of the shell, as the fastener cannot be used for grip values below the value of the shell length.

An aim of the present invention is to provide a fastener in which the minimum grip value is not limited by the length of the shell.

Accordingly the present invention provides, in a first aspect, a fastener comprising a pin and a body; the pin comprising a radially enlarged head at one end and an elongated shank protruding therefrom; the body comprising a shell having a radially and axially enlarged head at a head end and an elongated shank protruding therefrom, and wherein an underhead contact surface is provided on the shell head; and wherein a bore extends axially throughout the shell head and the shell shank; the body further comprising a first engaging means located within at least part of the bore and having a leading end and a trailing end, the leading end being further away from the head end of the shell than the trailing end; wherein a second engaging means is located on the exterior of at least part of the pin shank, wherein the pin shank is insertable into the bore of the body from an end of the body remote from the head end, such that the first and second engaging means mutually engage, wherein the underhead contact surface of the shell head is located at an axial level between the leading end and the trailing end of the first engaging means.

The head of the body may be formed of a radiused member, wherein underhead contact surface is provided on an annular flange of the radiused member.

The first engaging means preferably comprises a nylon sleeve, and the second engaging means preferably comprises a plurality of barbs.

The present invention provides, in a further aspect, a method of securing a workpiece together using a fastener comprising a pin and a body; the pin comprising a radially enlarged head at one end and an elongated shank protruding herefrom; the body comprising a shell having a radially and axially enlarged head at a head end and an elongated shank protruding therefrom, and wherein an underhead contact surface is provided on the shell head; and wherein a bore extends axially throughout the shell head and the shell shank; the body further comprising a first engaging means located within at least part of the bore and having a leading end and a trailing end, the leading end being further away from the head end of the shell than the trailing end; wherein a second engaging means is located on the exterior of at least part of the pin shank, wherein the pin shank is insertable into the bore of the body from an end of the body remote from the head end, such that the first and second engaging means mutually engage, wherein the underhead contact surface of the shell head is located at an axial level between the leading end and the trailing end of the first engaging means, wherein the workpiece comprises a first and a second workpiece member, which method comprises; inserting the pin of the fastener into aligned apertures in the first and second workpiece members until an underside surface of the pin head abuts an outer face of the first workpiece member and part of the pin shank protrudes from an outer face of the second workpiece member; subsequently, positioning the body of the fastener, shank first, over the protruding end of the pin shank, until the leading end of the first engaging means abuts the second engaging means; subsequently, applying pressure to the body thereby to push the body into the apertures of the first and second workpiece members, until the underhead contact surface contacts the outer face of the second workpiece member; and pulling the protruding end of the pin shank relative to the body, thereby causing the first engaging means and the second engaging means to mutually engage; wherein the protruding end of the pin shank is pulled relative to the body until the pin shank breaks at a breakneck point.

BRIEF DESCRIPTION OF THE DRAWINGS

An embodiment of the present invention will now be described by way of example and with reference to the accompanying drawings in which.

DETAILED DESCRIPTION OF THE DRAWINGS

Figure 1A:
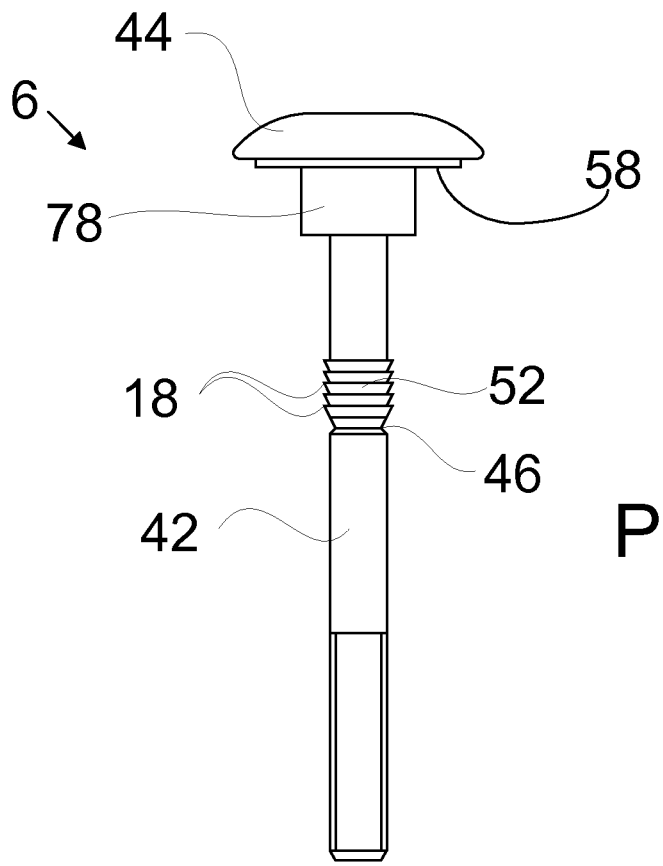
FIG. 1a is a side view of the pin of a prior art fastener.
Figure 1B:
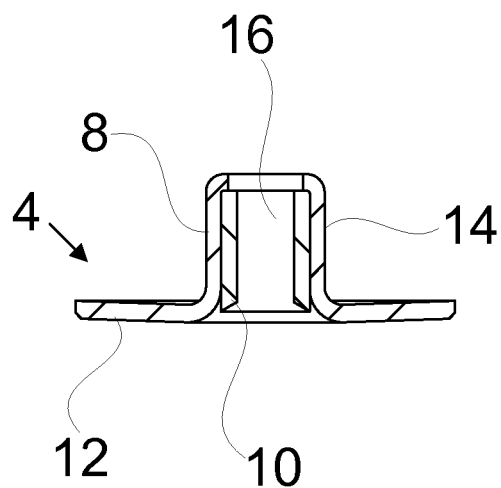
FIG. 1b is a cross-sectional view of the body of a prior art fastener.
Figure 2A:
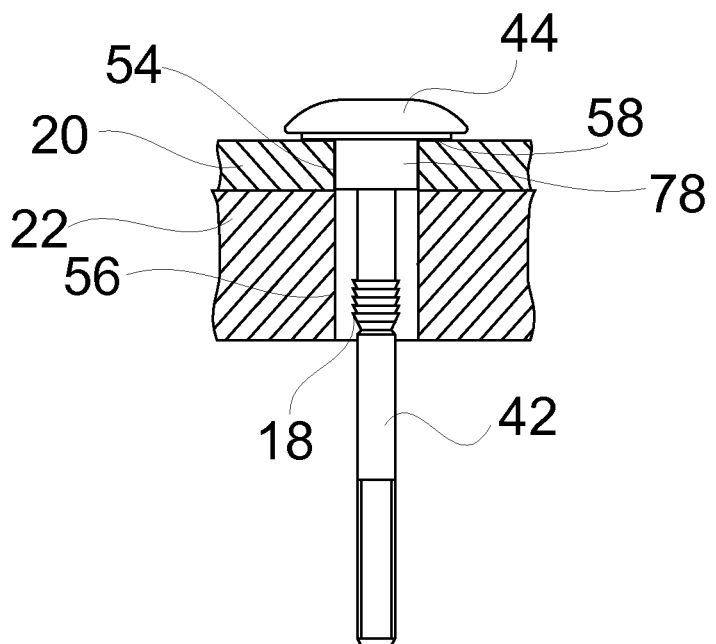
FIGS. 2a and 2b are partial cross-sectional views of the installation sequence of a prior art fastener.
Figure 2B:
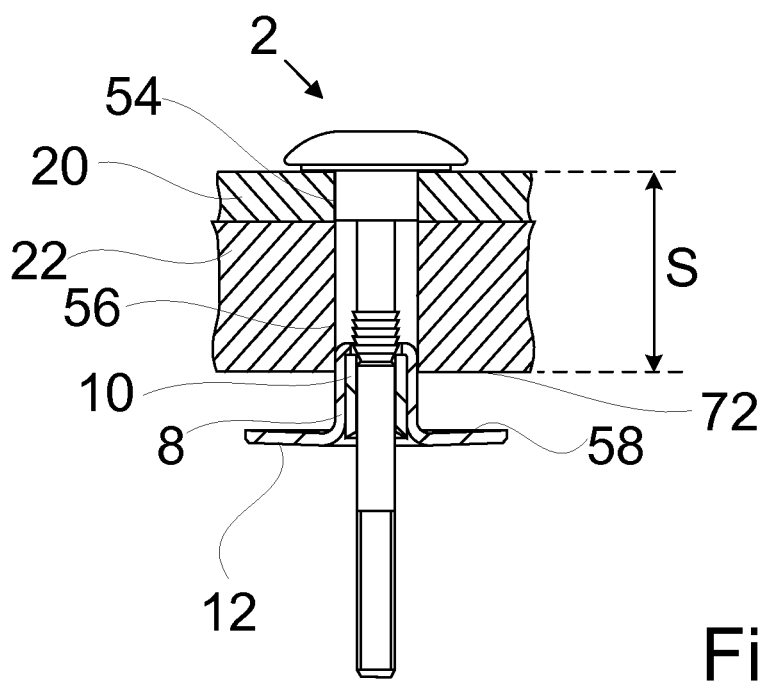
Figure 3:
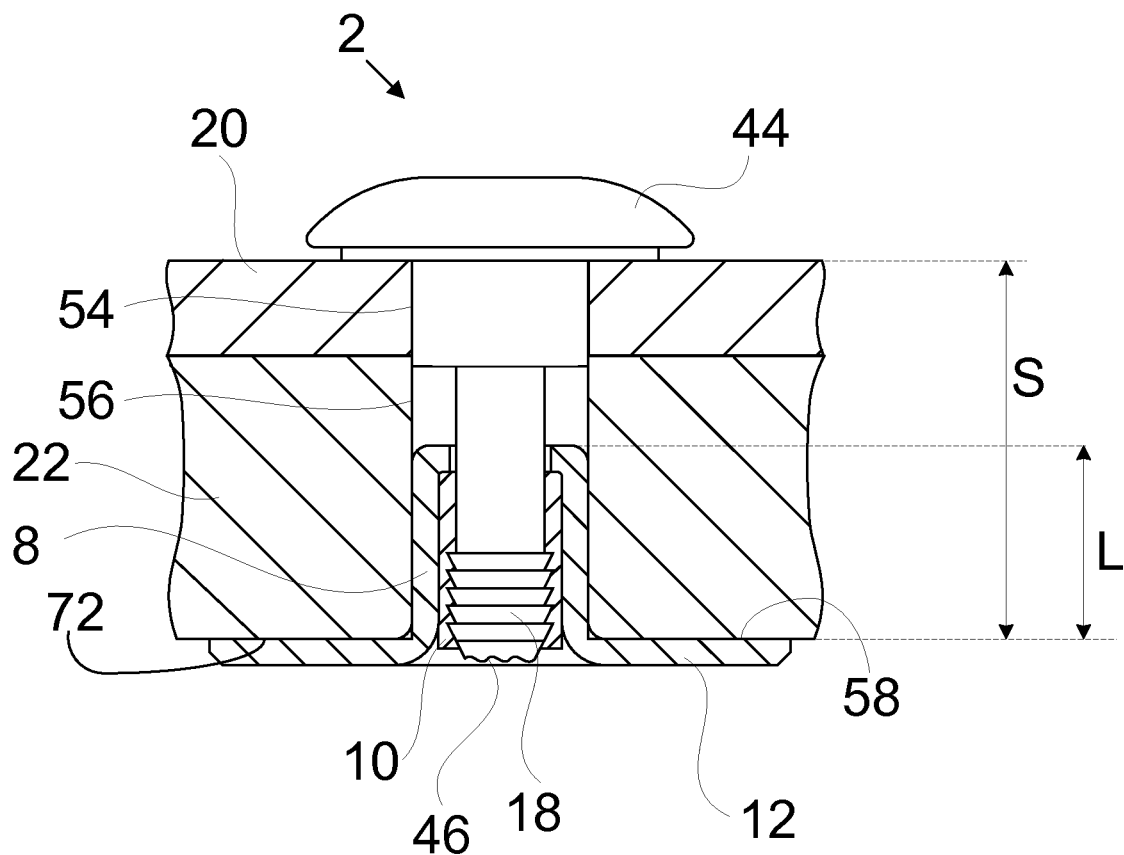
FIG. 3 is a partial cross-sectional view of a fully installed prior art fastener.
Figure 4:
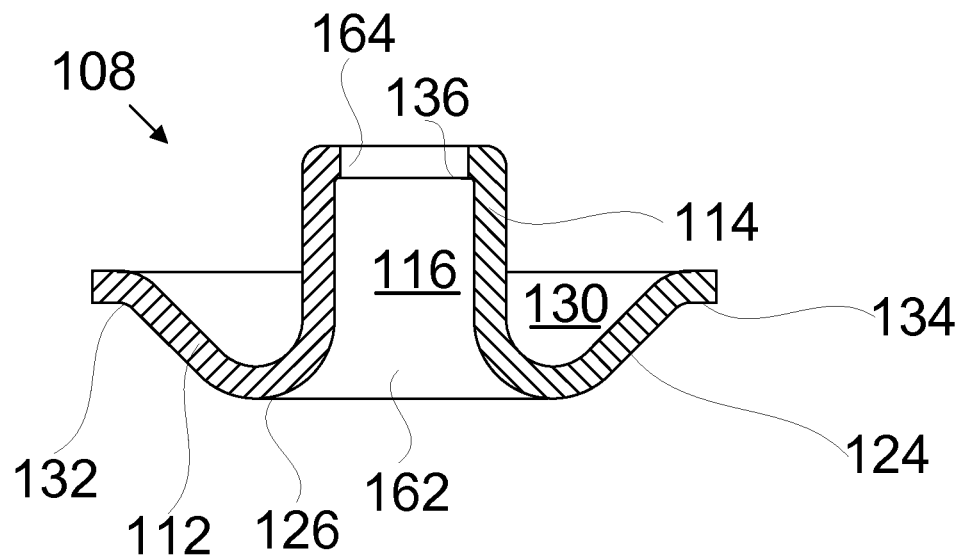
FIG. 4 is a cross-sectional view of the shell of a fastener in accordance with the present invention.
Figure 5:
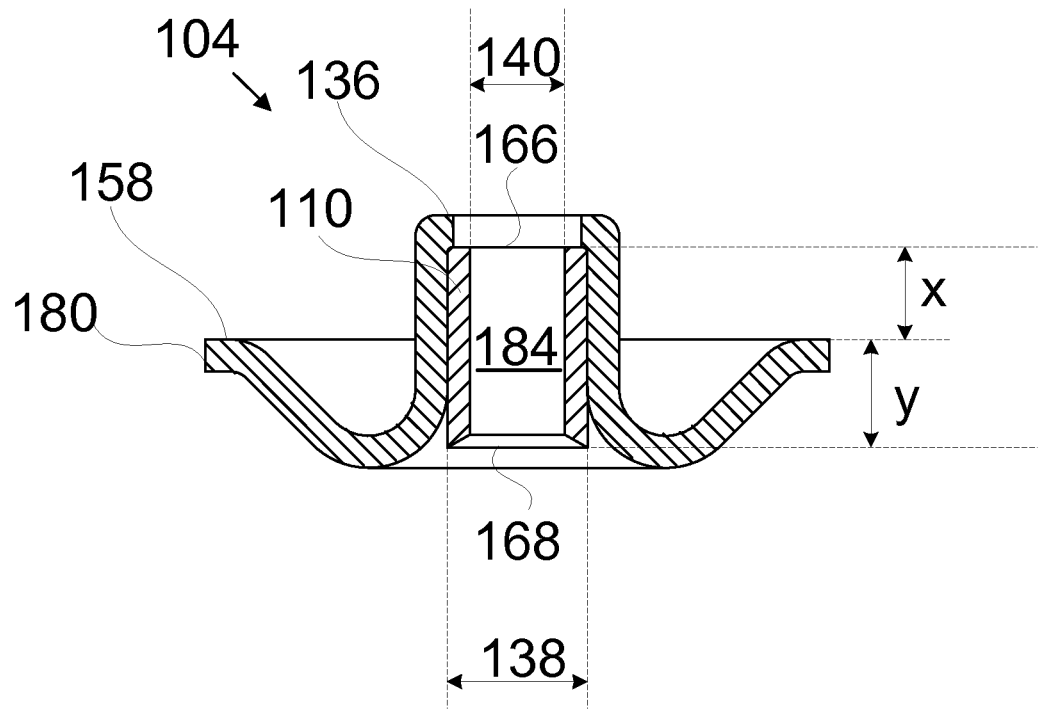
FIG. 5 is a cross-sectional view of the body of a fastener in accordance with the present invention.
Figure 6:
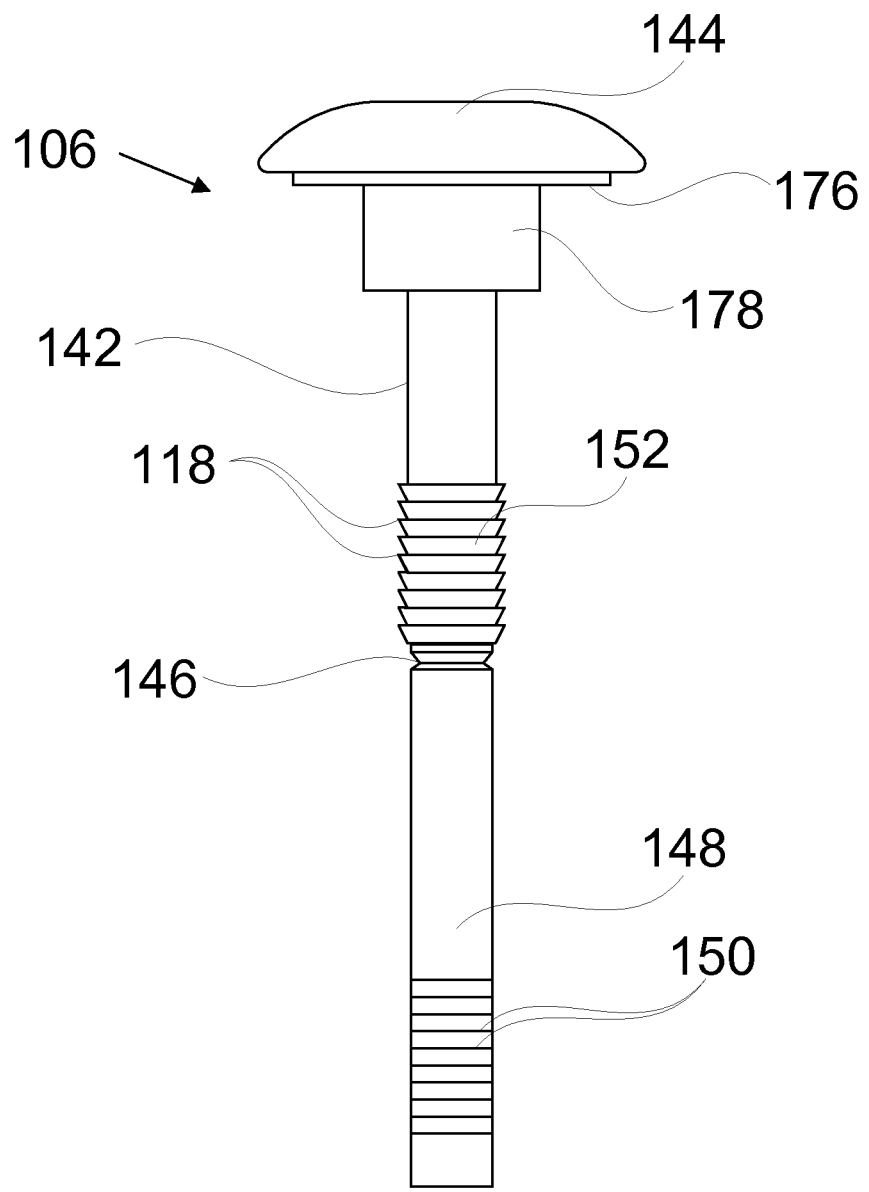
FIG. 6 is a side view of a pin of a fastener in accordance with the present invention.

Referring to FIGS. 4 to 6, the fastener of the present invention comprises a first part comprising a body 104 (FIG. 5) and a second part comprising a pin 106 (FIG. 6). The body 104 comprises a steel shell 108 (FIG. 4) and a nylon sleeve 110. The shell 108 comprises a radially enlarged head 112 provided at a head end 162, and a tubular elongated shank 114 extending away from the head 112. The sleeve 110 is positioned within a cylindrical bore 116 which runs throughout the shell 108.

The shell head 112 is formed by an outwardly extending member having a first annular radiused edge 126 and a second annular radiused edge 132, further away from the axial centre of the shell 108 than the first annular radiused edge 126. The form of the member 124 is such that an annular space 130 is formed underneath the shell head 112. Beyond the second annular raised edge 132, the shell head extremity 180 (i.e. the part of the shell head 112 which is furthest from the body shank 114) is formed by an annular flange 134. The annular flange 134 defines an underhead surface 158 (which forms a contact surface on installation of the fastener into a workpiece).

The tail end 164 of the shell 108 is formed with an inwardly extending flange 136. The sleeve 110 extends from the inwardly extending flange 136 nearly to the top of the shell head 112, i.e. a small clearance remains between the level of the top of the shell head 112 and the top of the sleeve 110. The exterior diameter 138 of the sleeve 110 is such that the sleeve 110 is a push fit in the bore 116 of the shell shank 114, and the internal diameter 140 of the sleeve 110 is less than that of the aperture defined inside the inwardly extending flange 136 at the tail end of the shell 108. The sleeve 110 also has a bore, 184, extending throughout its length.

The sleeve 110 has a leading end 166 and a trailing end 168. As illustrated, the underhead surface 158 of the shell head 112 is at an axial distance 'x' from the leading end 166 of the sleeve 110, and at an axial distance 'y' from the trailing end the shell head 112 are both disposed at an axial level which is at a midpoint of the sleeve 110.

The pin 106 is also formed of steel, and comprises an elongated shank 142 and a radially enlarged head 144 having a flat underhead surface 176. The pin shank 142 comprises a plain portion 178 immediately below the pin head 144, a barbed portion 152 (which forms a second engaging means) comprising a plurality of barbs 118 below the plain portion 178, a breakneck point 146, and a pin tail 148 provided with pulling grooves 150 to allow for installation of the fastener 102.

The external diameter of the pin tail 148 is a sliding fit within the bore 184 of the sleeve, and the maximum external diameter of the barbed portion 152 is greater than the internal diameter 140 of the sleeve 110.

Figure 7:
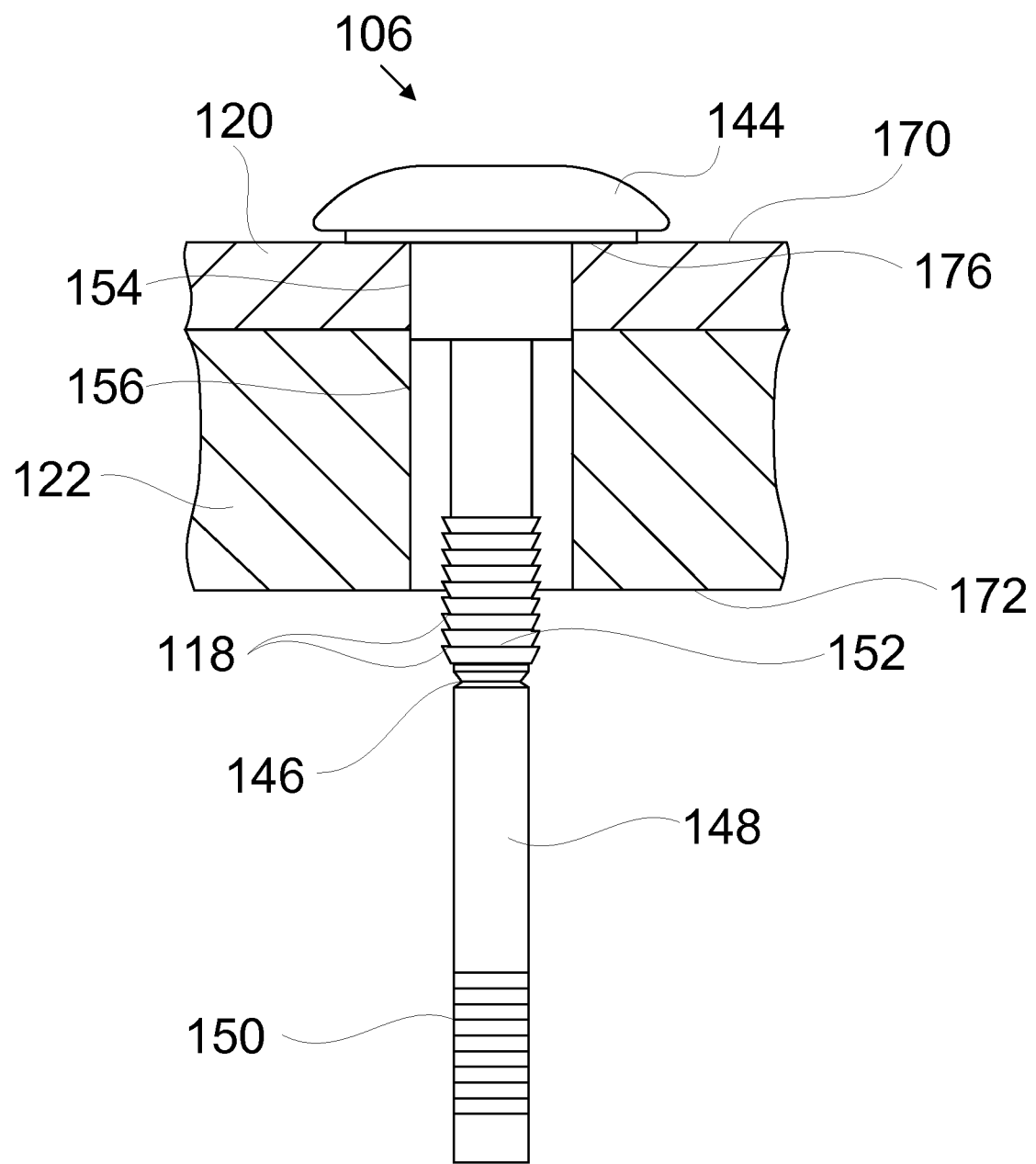
FIG. 7 is a partial cross-sectional view of the first stage of installation of a fastener in accordance with the present invention into a workpiece.
Figure 8:
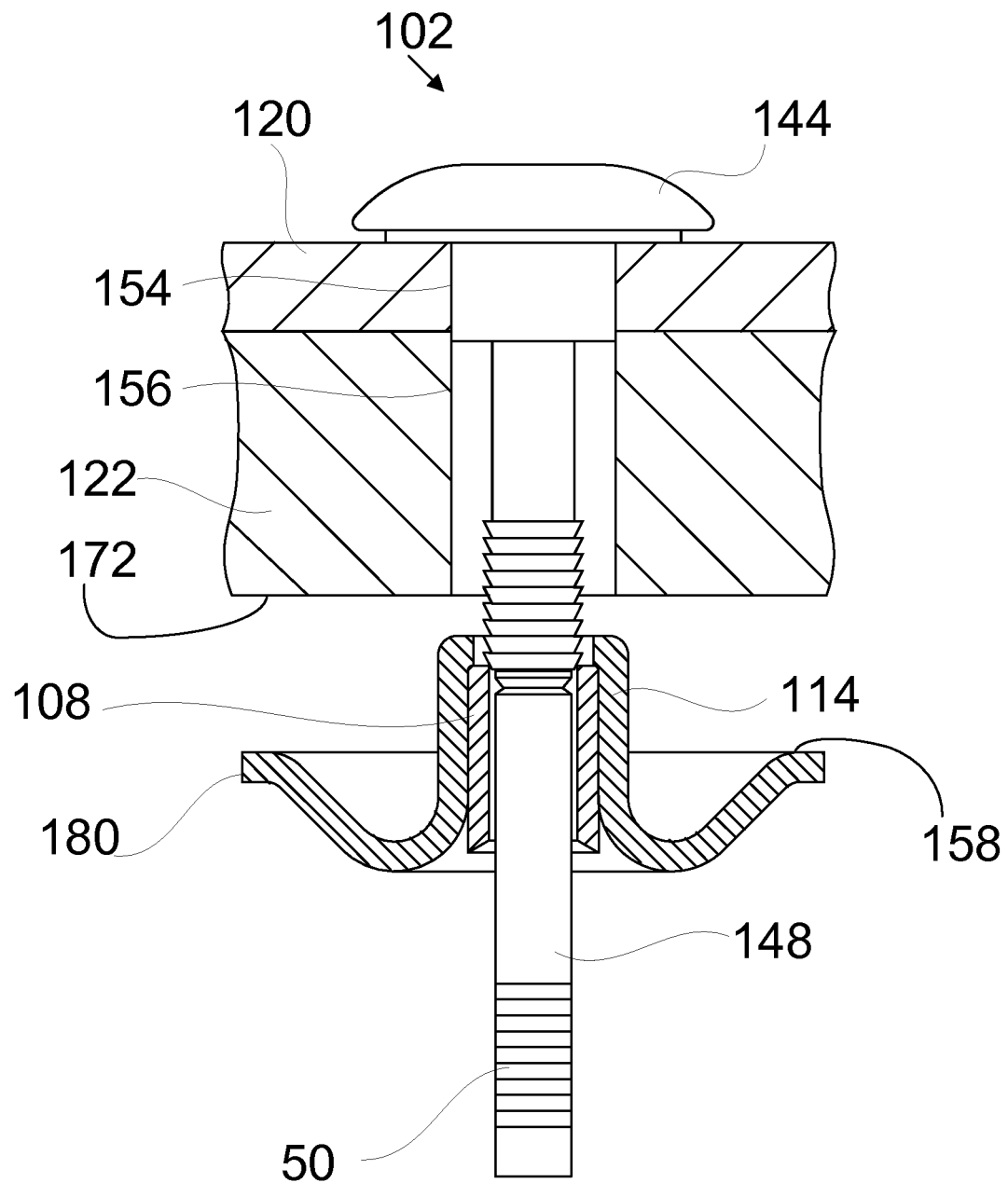
FIG. 8 is a partial cross-sectional view of the second stage of installation of a fastener in accordance with the present invention into a workpiece.

FIGS. 7 and 8 illustrates the first and second stages of installing the into a workpiece comprising a first workpiece member 120 and a second workpiece member 122.

The first step of installation is to insert the pin shank 142 through the apertures 154, 156 provided in the workpiece members 120, 122. The plain portion 178 of the pin shank 142 is a press fit within the workpiece apertures 154, 156. until the underside surface 176 of the pin head 144 abuts the outer face 170 of the first workpiece member 120, and the pin tail 148 protrudes from the outer face 172 of the second workpiece member 122. FIG. 7 shows the pin 106 fully inserted in the apertures 154, 156 as above.

The second step of installation is to position the body 104 manually, shank 1 14 first, over the pin tail 148, until the leading end 66 of the sleeve 1 10 abuts the barbed portion 152 of the pin 106. Due to the maximum external diameter of the barbed portion 152 being greater that the internal diameter 140 of the sleeve 1 10, it is not possible to manually insert the body 106 any further along the pin shank 142.

A suitable tool is then used to complete the installation of the fastener 102. This stage of the installation will not be described in detail as it is well known. In summary, the tool applies pressure to the first radiused edge 126 of the shell head 112, and the pulling grooves 150 provided on the pin shank 142 enable the pin shank 142 to be pulled relative to the body 104. During the pulling of the pin shank 142, the barbed portion 152 is forced into the sleeve 110, thereby causing the barbed portion 152 and the sleeve 110 to mutually engage. The pin shank 142 is pulled until the underhead surface 158 of the shell head 1 12 contacts the outer face 172 of the second workpiece member 122, and subsequently the pin shank 142 fails in tension at the breakneck point 146. The workpiece members 120, 122 are thereby secured together.

The breakneck point 146 is sufficiently close to the barbed portion 152, (i.e. the clearance between the trailing end 168 of the sleeve 110 and the top of the shell head 112 is sufficient) that the broken end of the pin 106 does not protrude beyond the level of the end of the shell head 112.

Figure 9:
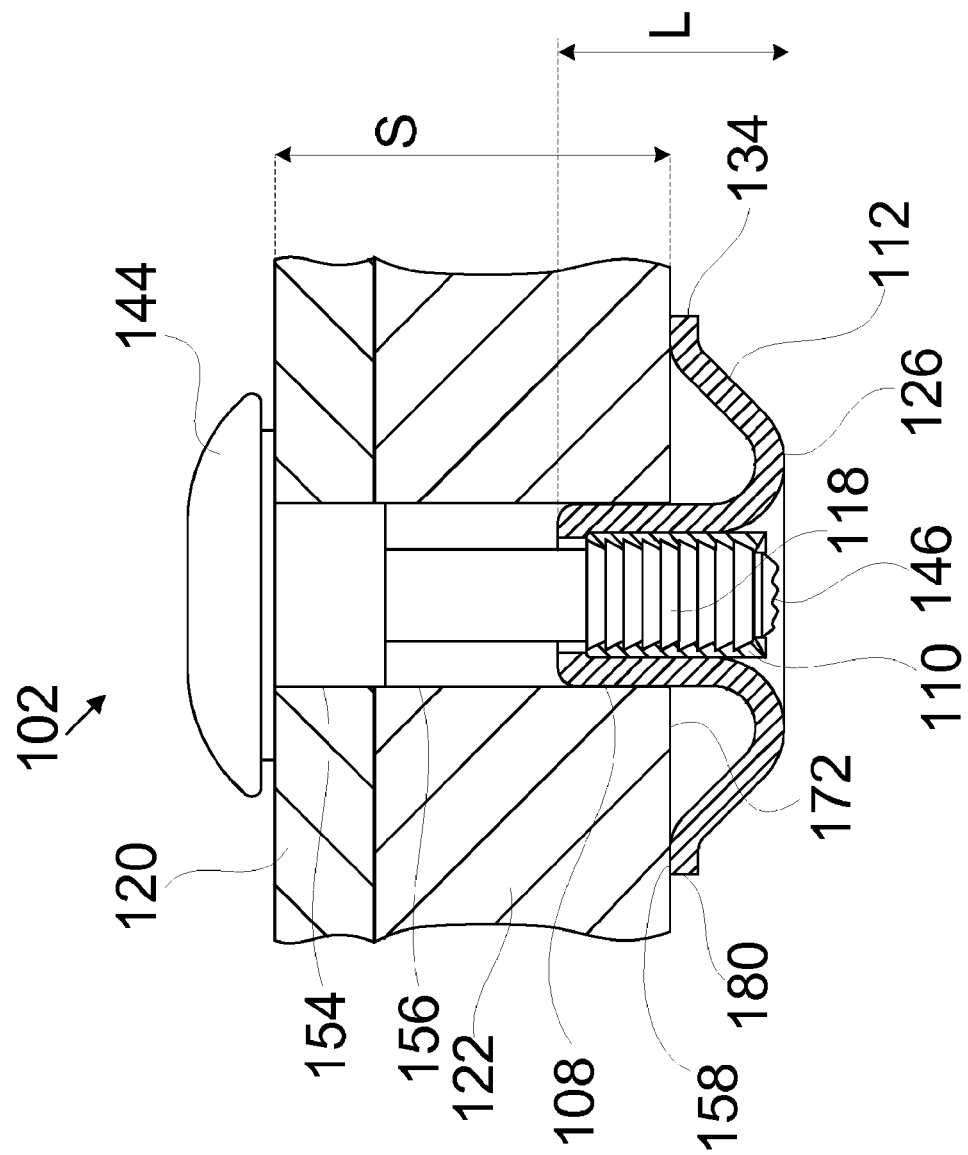
FIG. 9 is a partial cross-sectional view of a fastener in accordance with the present invention, having a relatively long pin, fully installed into a workpiece having a relatively large grip S.
Figure 10:
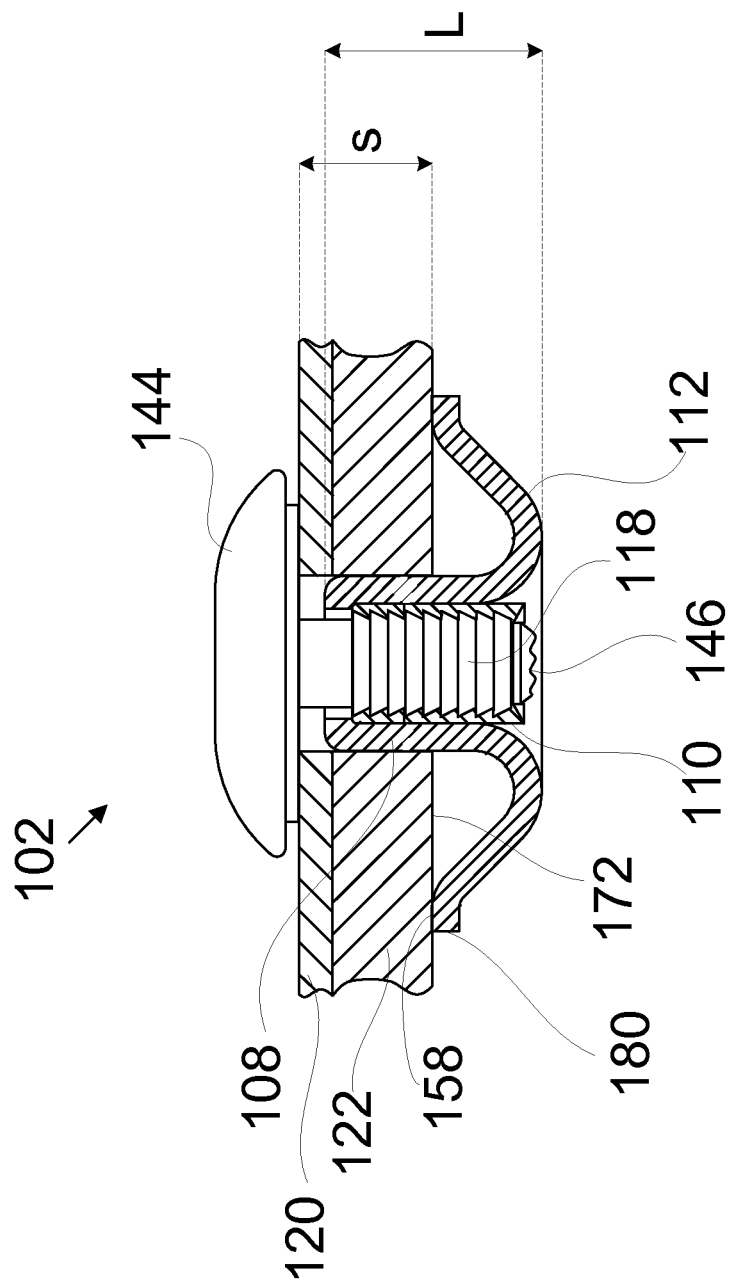
FIG. 10 is a partial cross-sectional view of a fastener in accordance with the present invention, having a relatively short pin, fully installed into a workpiece having a relatively small grip s.

FIGS. 9 and 10 show the fastener 102 fully installed to secure into the workpiece members 120, 122 together. FIG. 9 illustrates the fastener 102 installed into a workpiece having a relatively large grip S, and FIG. 10, a relatively small grip, s. (The shell is of an equal length L in both FIGS. 9 and 10, however the pin 6 of FIG. 9 is longer than that of FIG. 10).

It can be seen that, because the underhead surface 158 of the shell head 112 which contacts the outer face 172 of second workpiece member 122, lies at a level midway between the leading end 166 and the trailing end 168 of the sleeve 110, part of the sleeve 110, part of the shell shank 114 surrounding it, and also part of the barbed portion 152, extend beyond the outer surface 172 of the second workpiece member 122. Accordingly, full engagement of the barbed portion 152 and the sleeve 110 will always be attained on installation of the fastener 102, even if the grip of the workpiece is less than the length of the shell 110. This is illustrated in FIG. 10, wherein, even though the relatively small workpiece grip 's' is less than the length 'L' of the shell, full engagement of the barbs 118 into the sleeve 110 is achieved. In the embodiment shown in FIG. 10, the grip 's' of the workpiece can be equal to or greater than approximately half of the length 'L' of the shell.

What is claimed:

1. A fastener comprising a pin and a body;
   the pin comprising a radially enlarged pin head at one end and an elongated pin shank protruding therefrom;
   the body comprising a shell having a radially and axially enlarged shell head at a head end of the shell and an elongated shell shank protruding therefrom, and wherein an underhead contact surface is provided on the shell head;
   and wherein a bore extends axially throughout the shell head and the shell shank;
   the body further comprising a first elongate engaging means located within at least part of the bore, the first elongate engaging means having a leading end and a trailing end, the leading end being further away from the head end of the shell than the trailing end is;
   wherein a second engaging means is located on the exterior of at least part of the pin shank,
   wherein the pin shank is insertable into the bore of the body from an end of the body remote from the head end of the shell, such that the first elongate engaging means and the second engaging means mutually engage,
   wherein the underhead contact surface of the shell head is located at an axial level between the leading end of the first elongate engaging means and a midpoint of the first elongate engaging means.

2. A fastener as claimed in claim 1 wherein the shell head is formed of a radiused member, wherein the underhead contact surface is provided on an annular flange of the radiused member.

3. A fastener as claimed in claim 1 wherein the first elongate engaging means comprises a nylon sleeve.

4. A fastener as claimed in claim 1 wherein the second engaging means comprises a plurality of barbs.

5. A method of securing a workpiece together using a fastener comprising a pin and a body;
   the pin comprising a radially enlarged head at one end and an elongated shank protruding herefrom;
   the body comprising a shell having a radially and axially enlarged head at a head end and an elongated shank protruding therefrom, and wherein an underhead contact surface is provided on the shell head; and
   wherein a bore extends axially throughout the shell head and the shell shank; the body further comprising a first elongate engaging means located within at least part of the bore and having a leading end and a trailing end, the leading end being further away from the head end of the shell than the trailing end;
   wherein a second engaging means is located on the exterior of at least part of the pin shank, wherein the pin shank is insertable into the bore of the body from an end of the body remote from the head end, such that the first elongate engaging means and the second engaging means mutually engage, wherein the underhead contact surface of the shell head is located at an axial level between the leading end of the first elongate engaging means and a midpoint of the first elongate engaging means, wherein the workpiece comprises a first and a second workpiece member, which method comprises;
   inserting the pin of the fastener into aligned apertures in the first and second workpiece members until an underside surface of the pin head abuts an outer face of the first workpiece member and part of the pin shank protrudes from an outer face of the second workpiece member;
   subsequently, positioning the body of the fastener, shell shank first, over the protruding end of the pin shank, until the leading end of the first elongate engaging means abuts the second engaging means;
   subsequently, applying pressure to the body thereby to push the body into the apertures of the first and second workpiece members, until the underhead contact surface contacts the outer face of the second workpiece member;
   and pulling the protruding end of the pin shank relative to the body, thereby causing the first elongate engaging means and the second engaging means to mutually engage;
   wherein the protruding end of the pin shank is pulled relative to the body until the pin shank breaks at a breakneck point.

* * * * *